Nov. 19, 1940.  C. T. GILDERSLEEVE  2,221,762
ONE-MAN CORN PICKING UNIT
Filed April 5, 1939  2 Sheets-Sheet 1
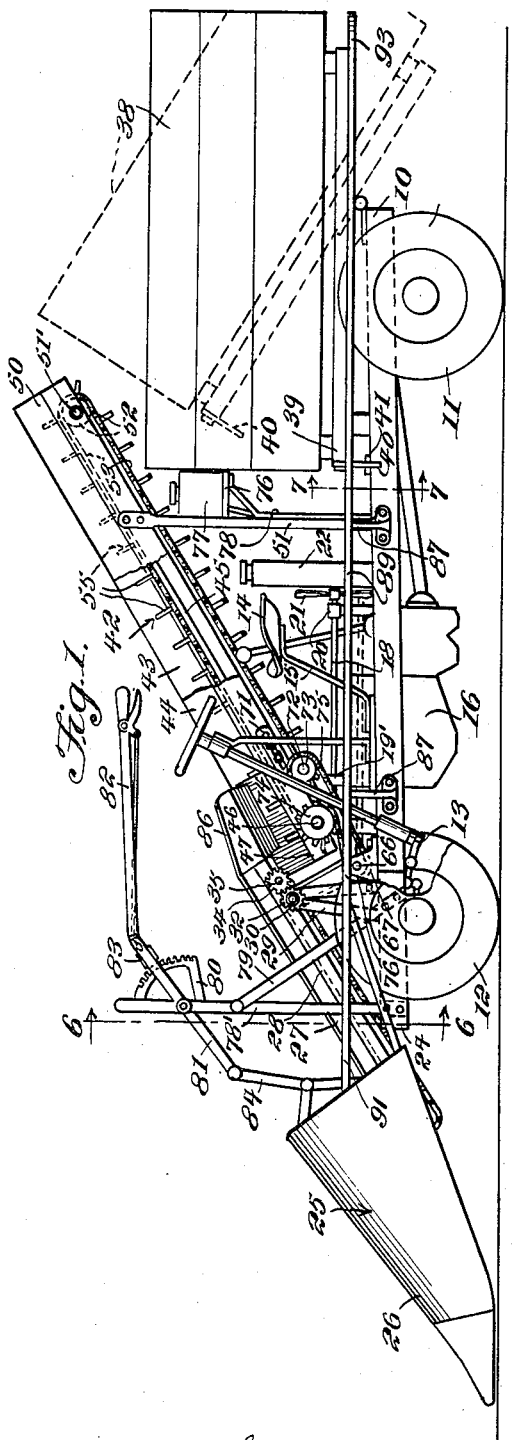
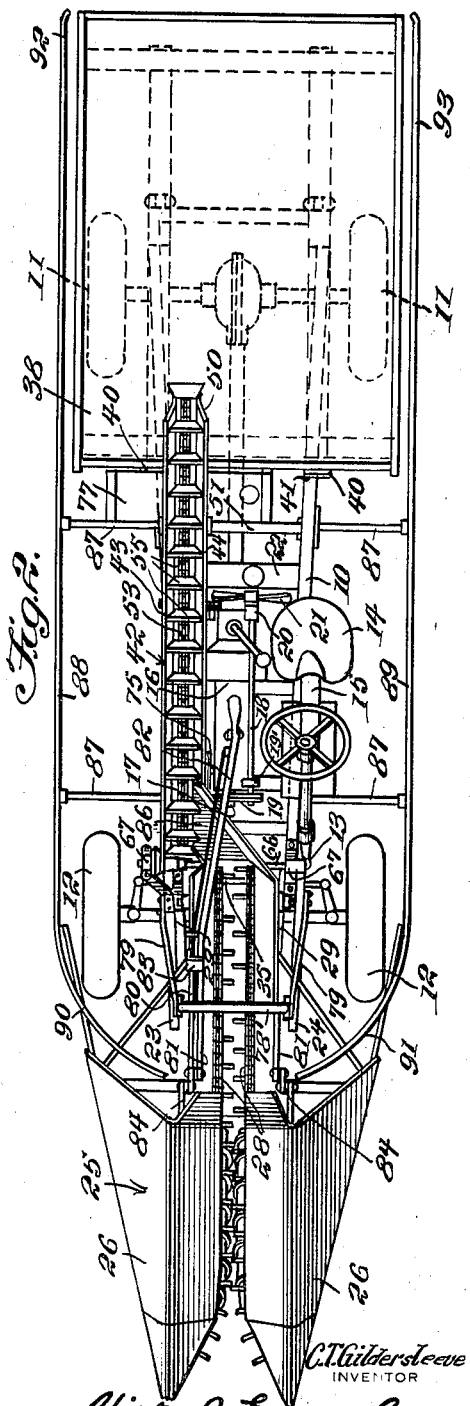
C. T. Gildersleeve
INVENTOR
BY Victor J. Evans & Co.
ATTORNEYS
WITNESS J. L. Wright Nov. 19, 1940.  C. T. GILDERSLEEVE  2,221,762
ONE-MAN CORN PICKING UNIT
Filed April 5, 1939  2 Sheets-Sheet 2
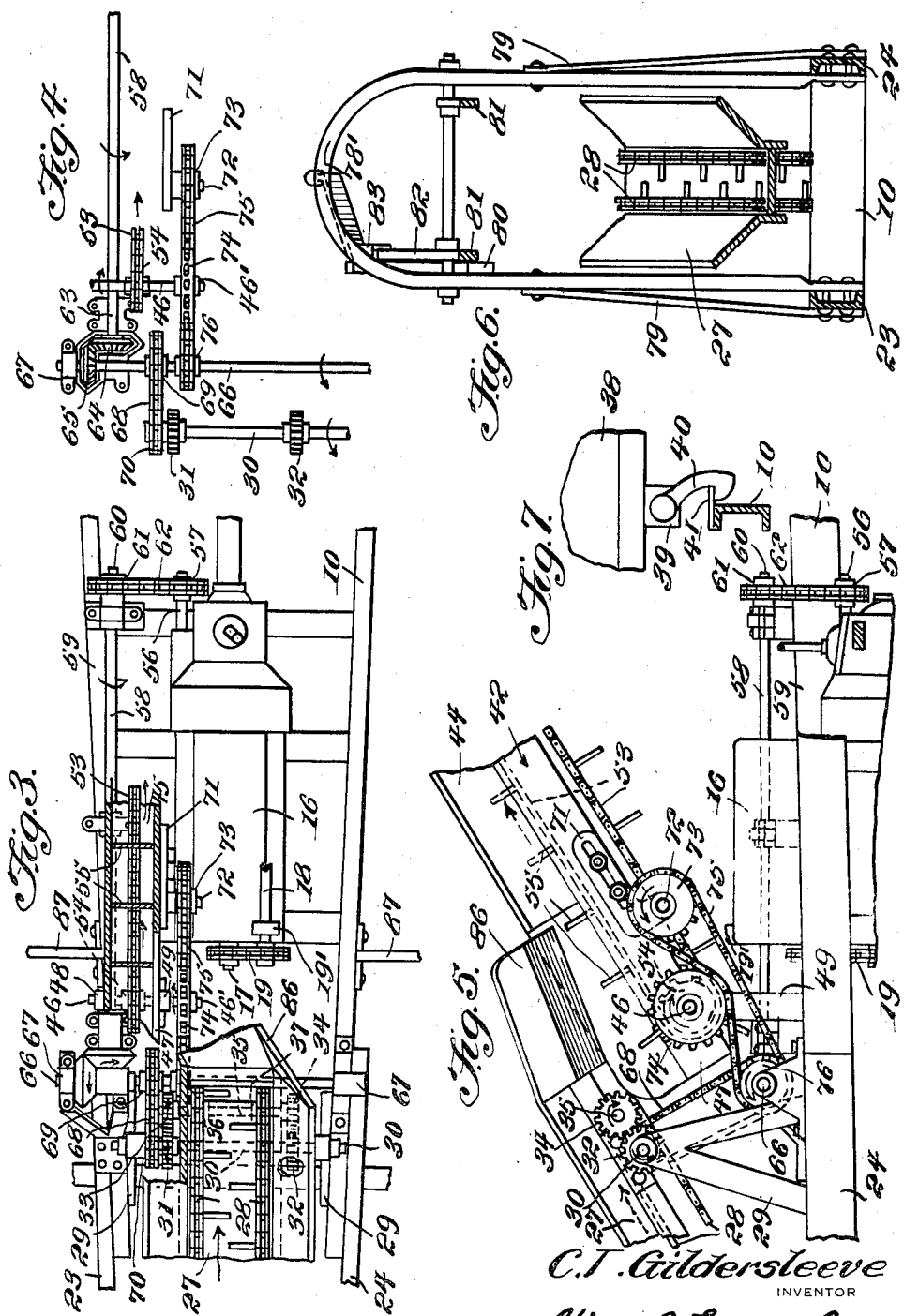

Patented Nov. 19, 1940

2,221,762

UNITED STATES PATENT OFFICE 2,221,762

ONE-MAN CORN PICKING UNIT

Charles T. Gildersleeve, Hudson, Ill.

Application April 5, 1939, Serial No. 266,223

6 Claims. (Cl. 56—18)

My invention relates to a corn picking attachment for an automotive vehicle.

An important object of my invention is the provision of a corn picking attachment that is adapted to be efficiently operated by one man.

Another object of my invention is the provision of a corn picking attachment for an automotive vehicle that is neat and efficient in its construction.

Yet another object of my invention is the provision of a corn picking attachment for an automotive vehicle in which no parts project laterally from the sides of the vehicle, so that the same may be driven along a highway without danger of any of the appurtenances engaging oncoming or passing vehicles.

Still another object of my invention is the provision of a corn picking attachment for an automotive vehicle that is simple in construction, efficient in operation and inexpensive to manufacture.

Other objects and advantages of my invention will be apparent during the course of the following description.

In the drawings, forming a part of this specification, and in which like numerals are employed to designate like parts throughout the same.

Figure 1 is a side elevation of a device embodying my invention, showing parts broken away, Figure 2 is a top plan view thereof, Figure 3 is a fragmentary top plan view of the driving mechanism, embodying a part of my invention, and showing its association with the engine and chassis of the said vehicle, Figure 4 is a fragmentary plan view of a part of the driving mechanism thereof, Figure 5 is a fragmentary side elevation illustrating yet another part of the driving mechanism of my invention, Figure 6 is a vertical sectional view, taken on the line 6—6 of Figure 1, and Figure 7 is a fragmentary sectional view, taken on the line 7—7 of Figure 1.

In the accompanying drawings, wherein for the purpose of illustration, is shown a preferred embodiment of my invention, the numeral 10 designates the chassis of an automotive vehicle having rear wheels 11, front wheels 12, and the conventional steering appurtenances 13. The driver's seat 14 is resiliently supported above the chassis 10 by means of the leaf spring support 15, and the engine 16 of the vehicle is positioned laterally of the seat 14. The drive shaft 17 of the engine 16 is connected to the shaft 18 by the belt 19 to impart rotation thereto. The shaft 18 is mounted for rotation in bearings 19 and 20 carried by the engine, and a fan 21 is disposed on the outer end thereof to force a blast of air through the radiator 22 disposed laterally of and behind the operator's seat 14. The supports 23 and 24 are secured to the chassis 10 adjacent the front thereof and extend forwardly a substantial distance therefrom.

A corn picker is designated in its entirety by the numeral 25 and includes gathering shields 26 and a central elevator 27. The elevator 27 is provided with the conventional gathering chains 28 which circumvent the same and are actuated by means hereinafter described. The bearing support brackets 29 are mounted on the front of the chassis 10 and the shaft 30 has the opposite ends thereof journaled in horizontal aligning openings adjacent the top thereof. The circular gears 31 and 32 are keyed, or otherwise secured, to the shaft 30 and enmeshed with the circular gears 33 and 34 carried by the shaft 35 which is mounted at the upper end of the elevator 27. The shaft 35 carries the conventional pulleys 36 and 37, intermediate the gears 33 and 34, about which the gathering chains 28 are trained.

The rear of the chassis 10 has a dump body 38 hingedly secured thereto. The dump body has depending brackets 39 secured on either side thereof adjacent its front. The catches 40 are pivotally carried by the brackets 39, and normally engage plates 41 which project outwardly from the sides of the chassis to normally hold the dump body in a horizontal position.

A conveyor 42 is carried by the vehicle intermediate the dump body 38 and the upper end of the elevator 27 of the corn picker 25. The conveyor is formed with outwardly divergent side walls 43 and 44 which are connected by a horizontally disposed baseboard 45. The conveyor is positioned laterally of the engine 16 but within the compass of the chassis 10. The shaft 46 extends transversely through the lower end 47 of the conveyor and the outwardly extending ends thereof are mounted for rotation in the vertically disposed bearing supports 48 and 49, carried by the chassis 10. The upper end 50 of the conveyor is rigidly supported by spaced vertically extending arms 51, and a transversely extending shaft 51' is mounted at the upper end thereof and carries a pulley 52. An endless web belt 53 is trained about the pulley 52 and a pulley 54 on the shaft 46. A plurality of spaced transversely extending risers 55 are carried by the belt 53 to convey the ears of corn deposited therebetween, into the dump body 38.

A power take-off shaft 56 extends from the differential of the engine 16 and a circular gear 57 is mounted on the end thereof for rotation therewith. A shaft 58 is carried longitudinally along the side 59 of the chassis and in spaced parallelism with the power take-off shaft 56. The end 60 of the shaft 58 is provided with a gear 61, and a chain 62 is entrained around the gears 57 and 61 to impart rotation to the shaft 58 from the power take-off shaft 56. The forward end 63 of the shaft 58 is provided with a bevelled gear 64 adapted to enmesh with a bevelled gear 65 secured to a transversely extending shaft 66. The shaft 66 extends transversely of the chassis 10 and either end thereof is journaled in bearing supports 67. An endless belt 68 connects the pulleys 69 and 70 carried by the shafts 66 and 30, respectively.

A longitudinally adjustable bracket 71 is carried by the inner side 44 of the conveyor and a stub shaft 72 projects laterally therefrom and has a gear 73 rotatably mounted thereon. The end 46' of the shaft 46 has a circular gear 74 keyed, or otherwise secured, thereon and a chain 75 is trained about the gear 73 and the gear 76 which is mounted for rotation with the shaft 66. The teeth of the gear 74 engage the upper run of the chain 75, and the longitudinal adjustment of the bracket 71 permits all slack to be easily and expeditiously removed from the chain.

The vertical supports 51 have a laterally extending platform 76 extending rearwardly therefrom and terminating adjacent of the front of the dump body 38. A gas tank 77 rests upon the platform and a gas feed line 78 discharges the contents thereof to the engine 16.

The forward extremities of the supports 23 and 24 have the arched vertically disposed support 78' bolted, or otherwise secured, thereto and angularly extending braces 79 aid in maintaining the support 78' in a rigid vertical position. A segmental gear 80 is secured to one side of the arch adjacent its top thereof and a pivoted lever 81 has the inner end 82 thereof bent angularly therewith and terminated at a point adjacent the driver's seat 14. A spring actuated catch 83 is fixed on the handle 82 and is adapted to engage with the teeth of the segmental gear 80 to hold the lever 81 in the proper selected angular position. A linkage 84 connects the forward end of the lever 81 to the gathering shields 26.

As clearly illustrated in Figures 1 and 2, the elevator of the corn picker 25 is disposed laterally and above the lower end of the endless conveyor 42 and is therefore provided with a delivery shield 86 extending therefrom and adapted to receive the ears of corn carried by the elevator 27 and to discharge the same into the conveyor 42 where they are carried upwardly between the risers 55 and deposited in the dump body 38.

The chassis 10 is provided with spaced laterally extending braces 87 to which resilient runners 88 and 89 are attached. The forward ends 90 and 91 of the runners are curved inwardly and terminate adjacent the elevator 27, while the rear ends 92 and 93 thereof are spaced laterally from the sides of the dump body 38 and terminate adjacent the rear thereof.

The operation of my device is as follows:

The operator seated on the seat 14 is in a position to operate the truck in the conventional manner. The front and rear wheels 11 and 12 are driven in straddling relation to a row of corn and the corn picker 25 is lowered in a manner whereby the forward end thereof will be positioned adjacent the ground, as illustrated in Figure 1. This may be easily and expeditiously accomplished by manually grasping the lever 82 and pivoting the same to the desired angular position, and it will not be necessary for the operator to leave his position on the seat 14 in order to accomplish this operation.

When the motor is running, the power take-off shaft 56 will transmit the rotation to shaft 58, which will in turn cause the shaft 66 to be rotated through the bevelled gears 64 and 65. The belt 68 connects the shaft 66 and the shaft 30 to cause the rotation of the shaft 66 to be transmitted to the shaft 30, and the circular gears 31 and 32 of the shaft 30 are enmeshed with the gears 33 and 34 of the elevator 27. This will cause the endless belt carried by the elevator to move the ears of corn there-along and to deposit the same in the endless conveyor 42 by way of the laterally disposed delivery shield 86. The rotation of shaft 66 will be concurrently transmitted to the endless belt 53 of the conveyor 42 through the chain 75 which engages the circular gear 74 to rotate shaft 46, and consequently the pulley 54, about which the endless belt 53 is trained. The ears of corn being disposed between the risers 55 of the belt 53, will be carried upwardly and discharged into the dump body 38. When the dump body has become filled, the corn picker 25 may be raised to an unobstructing position and the device in its entirety motivated to any suitable storage place for the corn. The corn within the dump body 38 may be discharged therefrom by manually releasing the pivoted catches 40 to permit the inner end of the dump body 40 to move upwardly and to discharge the corn through a gate provided in the rear end wall thereof.

It may thus be seen that all of the operations required in the picking and disposing of the corn from a field may be easily and expeditiously accomplished by a single individual, and it will not be necessary for him to leave his position in the driver's seat in order to exercise complete control over all of the coacting appurtenances comprising the invention.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. In a corn picking apparatus of the type adapted to pick the ears of corn from a single row of stalks, the combination with an automobile chassis having an engine laterally of the driver's seat of a corn picker secured to the front of the chassis and positioned along the longitudinal axis thereof, a receptacle mounted at the rear of the said chassis, and a conveyor extending longitudinally of the frame laterally of the driver's seat, said conveyor being upwardly inclined toward the rearward end thereof and with the forward end positioned to receive ears from the said picker and to discharge the same into the said receptacle.

2. In a corn picking apparatus of the type adapted to pick the ears of corn from a single row of stalks, the combination with a wheeled automobile chassis having an engine laterally of the driver's seat of a corn picker pivotally mounted on the front of the said chassis and substantially midway between the wheels of the chassis, a box hingedly mounted on the rear of the said chassis, an endless conveyor mounted on the chassis between the picker and the box, said conveyor extending longitudinally of the chassis laterally of the driver's seat and upwardly inclined toward the rearward end thereof in a manner to receive the ears of corn from the corn picker and to discharge the same into the said box, and means operable from a point adjacent the driver's seat of the vehicle for raising and lowering the said corn picker.

3. In a corn picking apparatus of the type adapted to pick the ears of corn from a single row of stalks, the combination with a wheeled automobile chassis having an engine laterally of the driver's seat of a corn picker pivotally mounted on the front of the said chassis and substantially midway between the wheels of the chassis, a box hingedly mounted on the rear of the said chassis, an endless conveyor mounted on the chassis between the picker and the box, said conveyor extending longitudinally of the chassis laterally of the driver's seat and upwardly inclined toward the rearward end thereof in a manner to receive the ears of corn from the corn picker and to discharge the same into the said box, a vertical support carried adjacent the front of the chassis, a segmental gear secured to the said support, a manually actuated lever adjacent the driver's seat and having a spring catch to engage the said segmental gear, and linkage connecting the lever to the said corn picker to permit the same to be manually raised or lowered from a point adjacent the driver's seat.

4. In a corn picking apparatus of the type adapted to pick the ears of corn from a single row of stalks, the combination with a wheeled automobile chassis having an engine laterally of the driver's seat of a corn picker pivotally mounted on the front of the said chassis and substantially midway between the wheels of the chassis, a box hingedly mounted on the rear of the said chassis, an endless conveyor mounted on the chassis between the picker and the box, said conveyor extending longitudinally of the chassis laterally of the driver's seat and upwardly inclined toward the rearward end thereof in a manner to receive the ears of corn from the corn picker and to discharge the same into the said box, a vertical support carried adjacent the front of the chassis, a segmental gear secured to the said support, a manually actuated lever adjacent the driver's seat and having a spring catch to engage the said segmental gear, linkage connecting the lever to the said corn picker to permit the same to be manually raised or lowered from a point adjacent the driver's seat, drive means connecting the engine and the said corn picker, and means to actuate the endless conveyor from the drive means of the said corn picker.

5. In a corn picking apparatus of the type adapted to pick the ears of corn from a single row of stalks, the combination with a wheeled automobile chassis having a dump body mounted on the rear portion thereof and an engine positioned in front of the dump body and laterally of the driver's seat, of an endless conveyor mounted on the chassis laterally of the engine and within the compass of the said chassis, said conveyor being upwardly inclined toward the rearward end thereof in a manner to discharge into the said dump body, extensions secured to the sides of the chassis and extending forwardly thereof, and a corn picker pivotally mounted between the said extensions and in front of the said chassis substantially midway between the wheels of the chassis, whereby the wheels may be moved in straddling relation to a row of corn to position the said picker in alignment with the said row and to permit the picker to deliver the ears of corn to the said endless conveyor.

6. In a corn picking apparatus of the type adapted to pick the ears of corn from a single row of stalks, the combination with a wheeled automobile chassis having a dump body mounted on the rear portiont thereof and an engine positioned in front of the dump body and laterally of the driver's seat, of an endless conveyor mounted on the chassis laterally of the engine and within the compass of the said chassis, said conveyor being upwardly inclined toward the rearward end thereof in a manner to discharge into the said dump body, extensions secured to the sides of the chassis and extending forwardly thereof, a corn picker pivotally mounted between the said extensions and in front of the said chassis substantially midway between the wheels of the chassis, whereby the wheels may be moved in straddling relation to a row of corn to position the said picker in alignment with the said row to permit the picker to deliver the ears of corn to the said endless conveyor, and resilient guard rails arranged laterally of the chassis and extending from the front of the extensions to the rear of the dump body to deflect the rows of corn adjacent to the said mentioned row and to prevent the device from mutilating the said adjacent rows of corn.

CHARLES T. GILDERSLEEVE.